E. HED AND J. A. HELLSING.
CHANGE SPEED CONTROL MECHANISM.
APPLICATION FILED JULY 19, 1921.

1,434,384.

Patented Nov. 7, 1922.
2 SHEETS—SHEET 1.

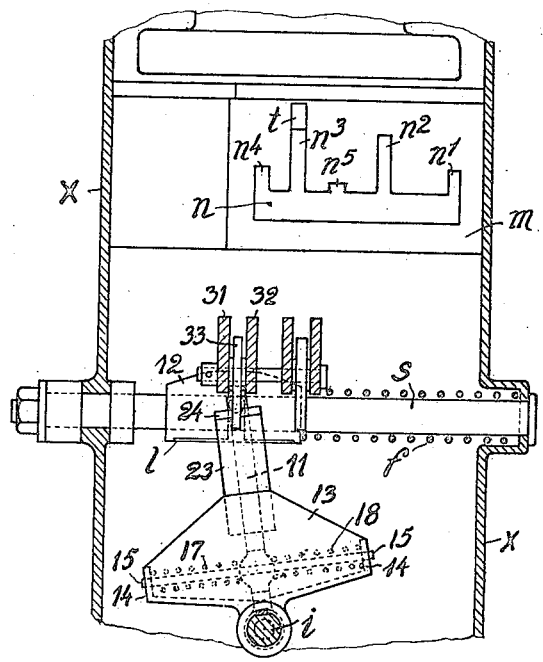

Patented Nov. 7, 1922.

1,434,384

UNITED STATES PATENT OFFICE.

EDVARD HED, OF STOCKHOLM, AND JOHAN AUGUST HELLSING, OF BARKARBY, SWEDEN.

CHANGE-SPEED-CONTROL MECHANISM.

Application filed July 19, 1921. Serial No. 485,889.

*To all whom it may concern:*

Be it known that we, EDVARD HED, residing at Karlbergsvägen 57, in the city of Stockholm, Sweden, and JOHAN AUGUST HELLSING, residing at Barkarby, Sweden, both subjects of the King of Sweden, have invented a Change-Speed-Control Mechanism, of which the following is a specification.

Our invention relates to the change speed control mechanism for automobiles and similar motor-driven vehicles and preferably for automobiles of the type, where the shaft of the gear which is intended to engage any one of a series of coaxial gears of different size is mounted in a support adapted to be swung on and slid along a fixed shaft.

Our invention is an improvement of the mechanism for that purpose shown and described in the Patent 1,108,784 where a toothed sector fastened on the hub or nave of the swingable and slidable support engages a rack on a slidable and turnable shaft on which the hand lever is fastened so that the hand lever must be swung and then moved sidewise when changing the speed.

One of the objects of our invention is to avoid the sidewise movement of the lever, i. e., the longitudinal movement of its shaft or pivot, and to diminish the range of its turning movement.

Another object is to make the change of the speed automatic so that the lever may be adjusted for a desired speed beforehand and the vehicle may run further with its present speed and the change to the new speed for which the lever has been adjusted may be effected automatically when a pedal or the like is actuated.

On the accompanying drawings

Figure 1:
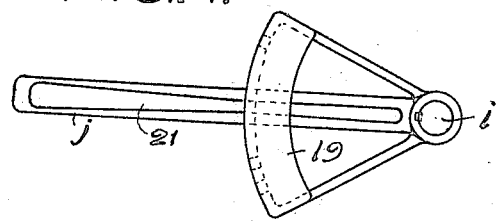
Fig. 1 is a plan view of the lever and the means for keeping it in the adjusted position.
Figure 2A:
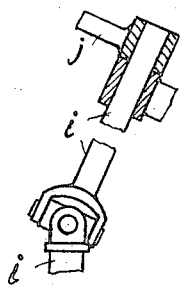
Fig. 2 is a vertical longitudinal section of the mechanism.
Figure 2:
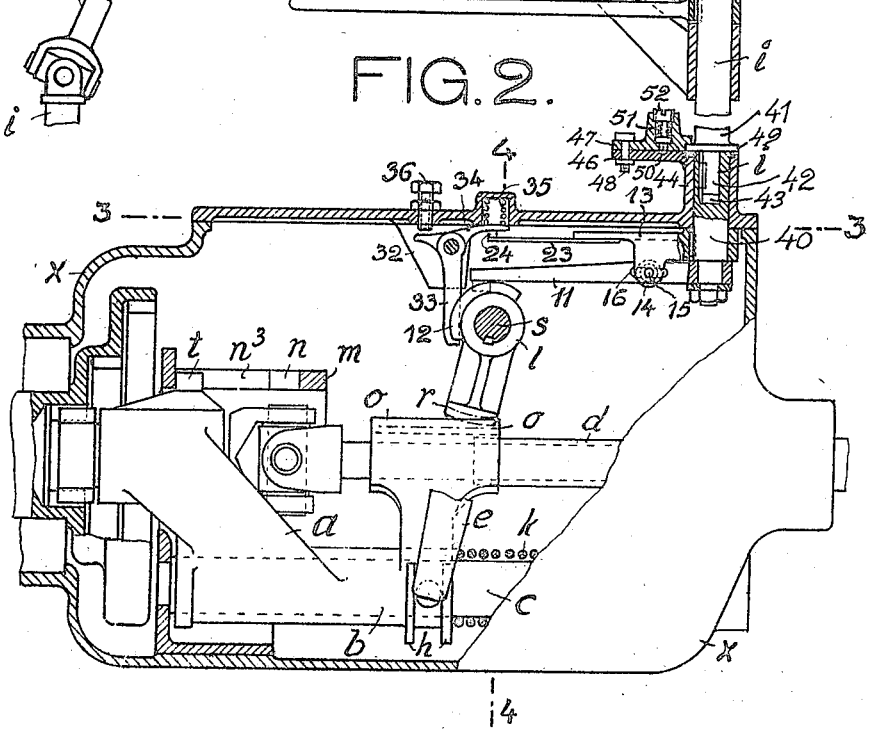

Fig. 2$^a$ is a side view of the pivot of the lever showing that said pivot may be provided with a universal joint.

Fig. 3 is a horizontal section on line 3—3 and Fig. 4 a vertical cross section on line 4—4 of Fig. 2.

$a$ is the support in which a portion of the driving shaft $d$ is mounted. The nave $b$ of the support is passed on a fixed shaft $c$ and has an open sector $o$ through which the driving shaft may be passed as shown in Fig. 4. The teeth of the sector $o$ engage the teeth of a rack $r$ fixed on a sleeve $l$ which is keyed on a transverse shaft $s$ mounted in the sides of the box or casing $x$ and adapted to rotate (about a quarter of a turn) but not slide in its bearings.

The sleeve $l$ with its rack $r$ partakes in the rotation of the shaft $s$ but is adapted to slide along it.

An arm $e$ keyed on the shaft $s$ engages a circular groove or two parallel ring flanges $h$ on the nave of the support.

A pedal $p$ is keyed to the shaft $s$ outside the box $x$. When the operator presses upon the pedal $p$, the shaft $s$ is turned counter-clockwise (Fig. 2), and thereby the support $a$ is slid to the right (by means of the arm $e$) for disengaging the driving gear from the driven gear. A spring $k$ on shaft $c$ pushes the support in opposite direction.

The operating hand lever $j$ is keyed to a vertical shaft $i$ adapted to rotate in fixed bearings. An arm 11 adapted to swing on shaft $i$ engages a groove $g$ on a double-conic portion 12 of the sleeve $l$.

Above the arm 11 a segment 13 is keyed to the shaft $i$. In depending lugs 14 on said segment is fixed a pin 15 which is passed through an elongated slot 16 in the arm 11. Springs 17, 18 passed on the pin tend to bring the arm 11 to partake in the movement of the segment 13, when the lever $j$ is swung in either direction for moving the rack $r$ along the shaft $s$ so as to swing the support $a$ (when the gears are disengaged) to a suitable position for a desired speed.

Fixed coaxially with the shaft $c$ in the box $x$ is a curved plate $m$ which has a slot $n$ with branches $n^1$, $n^2$, $n^3$, $n^4$, $n^5$. A stud $t$ on support $a$ engages said slot $n$ and moves along it when the support is swung. Owing to the spring $k$ on the shaft $c$ the stud $t$ will enter the branch slots when it is opposite any of these. In the position Fig. 2 the stud engages the slot $n^3$ which corresponds to the highest speed. The slot $n^1$ is for the lowest speed and $n^2$ for a medium speed. Slot $n^4$ is for back-movement and slot $n^5$ for stand still.

The hand lever $j$ is swingable along a bow 19, a flange 20 of which has notches corresponding to the slots $n^1$, $n^2$, $n^3$, $n^4$, and $n^5$ and is held in desired position by engaging said notches. In the example shown a spring rod 21, fixed to the lever engages the notches.

Supposing the stud $t$ be in slot $n^3$ (highest speed) and shall be shifted to slot $n^2$ (medium speed). For this purpose the operator presses down the rod 21 so as to disengage it from the notched flange and swings the lever $j$ to a position corresponding to the slot $n^2$. The rod 21 will engage the corresponding notch in the flange 20 and lock the lever $j$ in this new position. The segment 13 partakes in the movement of the lever $j$, and the springs 17, 18 tend to move the arm 11 the same way. This arm 11 can not partake, however, in the movement as the support $a$ is locked by the stud $t$ engaging the slot $n^3$. Thus the spring 17 will be compressed. For allowing the arm 11 to move it is necessary to press down the pedal $p$ so as to disengage the stud $t$ from the slot $n^3$. After such disengagement the compressed spring 17 will immediately move the arm 11 to the right (Figs. 3, 4), i. e. swing the support $a$ to a position with the stud $t$ opposite the slot $n^2$, and when the pressure on the pedal ceases the spring $k$ will push the support to the left (Fig. 2) so that the stud enters the slot $n^2$. In the same manner the stud $t$ is shifted to anyone of the slots in the plate $m$ by shifting the hand lever $j$ to the corresponding notch in the flange 20 and then pressing down the pedal.

The spring $f$ shown on the shaft $s$ is intended to balance the weight of the support $a$ when this is in a sloping position.

In order to prevent the arm 11 from being swung too far by the compressed spring 17 or 18 when the pedal is pressed down the following means is provided.

Between lugs 31, 32 inside the box $x$ is pivoted a trigger 33. A spring 23 fixed to the segment 13 has a cam 24 which, when resting underneath a finger 34 projecting from the trigger, will keep the trigger in a position adapted to slide on the double-conic portion 12 of the sleeve $l$ when this passes the trigger and to engage the groove $g$ when this crosses the path of the trigger so that the sleeve $l$, rack $r$ and support $a$ will be stopped and locked by the trigger in a certain position corresponding to one of the intermediate slots for instance $n^3$. Another similar trigger corresponds to the slot $n^2$. When the cam 24 is not right below the finger 34, the trigger is kept off the path of the sleeve $l$ by a spring 35 which acts on the upper side of the finger 34. This spring 35 is weaker than the spring 23 so that it yields when the spring 23 passes the finger. A stop-screw 36 limits the disengaging movement of the trigger so that the cam 24 always can pass underneath the finger and lift the same.

The plane of rotation of the hand lever $j$ may be sloping if preferred. For this purpose the shaft $i$ may be in two portions connected by a universal joint as indicated in Fig. 2ᵃ.

To avoid misunderstanding it may be noted that the forms and details now described and shown on the drawings are examples only for illustrating the principle of our invention and that all variations covered by this principle should be considered as parts of the invention. So for instance the number of the slots in plate $m$ and the corresponding notches in flange 20 may vary and should correspond to the number of speeds for which the gearing is constructed. The slot $n^5$ is not necessary but may be useful for preventing accidental sliding of the stud $t$ from the standstill position.

The sector $o$ and rack $r$ may be replaced by any other suitable means for transferring movement from the sleeve $l$ to the support $a$. Instead of the spring rod 21 any other means for locking the lever in the adjusted position may be used of course.

For preventing theft of the automobile the shaft $i$ of the lever $j$ may be made in two parts 40, 41 locked together in such a manner that the upper part together with the lever $j$ can be quickly taken away. In the example shown in Fig. 2 the upper part 41 has a stud 42 with a key adapted to be passed into a slotted socket 43 in the lower part 40 or vice versa.

The bearing 44 of the lower part 40 has a projection 46 on which a member 47 is pivoted by a pin 48 and adapted to engage a flange 49 on the lower end of the upper part 41. A loose stud 50 placed in a socket in member 47 engages a groove in the projection 46 so as to keep the member 47 in the locking position. A spring 51 which rests against a screw 52 or the like keeps the stud 50 in working position but is adapted to yield when the member 47 is swung sidewise for disengaging it from the flange when the lever with part 41 should be taken away.

It is obvious that any other suitable means may be used for the same purpose.

What we claim is:

1. A control mechanism for change speed gearings where a portion of the driving shaft is mounted in a swingable and slidable support, characterized by a hand lever, an arm adapted to swing on the pivot of said lever and engaging a sleeve keyed on and adapted to slide along a turnable shaft so as to swing the support, springs acting upon said arm and adapted to move the arm corresponding to a previous movement of the lever for shifting the position of the sleeve and thereby the position of the support.

2. A change speed control mechanism comprising a slidable and turnable support for a portion of the driving shaft, a transverse shaft with an arm which engages the support, a pedal for turning said shaft so as to slide the support and disengage the gears, a spring for pushing the support in opposite direction, a sleeve adapted to slide on the transverse shaft, means for transferring movement from the sleeve to the support so as to swing the latter when the gears are disengaged, a hand lever with a vertical pivot, a loose arm on the pivot which arm engages the sleeve, and yielding means which tend to bring the arm to partake in the movements of the hand lever, means for locking the support in different positions, means for locking the lever in corresponding positions, the yielding means being adapted to slide the sleeve and swing the support to a position determined by a previous adjustment of the position of the lever.

3. A change speed control mechanism comprising a support adapted to swing and slide on a fixed shaft, a spring on said shaft adapted to slide the support in one direction, a transverse shaft, a sleeve keyed on and adapted to slide along said shaft, an arm keyed on said shaft and engaging the support, a pedal adapted to turn the shaft so as to slide the support in opposite direction, a rack on the sleeve engaging a toothed sector on the support, a hand lever with a vertical pivot, an arm on said pivot engaging the sleeve and adapted to swing independently of the lever, a segment fixed on the pivot, springs between the arm and lugs on the segment and adapted to swing the arm so as to slide the sleeve and thereby swing the support to a position corresponding to a previously adjusted position of the arm when the pedal is actuated.

4. A change speed control mechanism as set forth in claim 2, including means for stopping and locking the sleeve when the proper position has been reached.

5. A change speed control mechanism as set forth in claim 2, including means for stopping and locking the sleeve consisting of a double-conic portion of the sleeve, a trigger, a spring partaking in the movement of the hand lever and adapted to swing the trigger into the path of said portion so as to engage a groove on the sleeve.

6. A change speed control mechanism as set forth in claim 2, including means for stopping and locking the sleeve consisting of a double-conic portion of the sleeve, a trigger, a spring partaking in the movement of the hand lever and adapted to swing the trigger into the path of said portion so as to engage a groove in said sleeve, and a second spring adapted to swing the trigger off the path of the sleeve when not actuated by the first mentioned spring, and means for limiting said movement.

7. A change speed control mechanism as set forth in claim 2, including means for stopping and locking the sleeve when the proper position is reached, said means consisting of a spring fixed on the pivot of the hand lever and having a cam adapted to engage a finger on a trigger so as to bring the trigger into the path of a double-conic portion of the sleeve, said portion having a groove for catching the trigger so as to be stopped and locked by the trigger, a spring weaker than the mentioned spring and adapted to swing the trigger off the path of the sleeve when not engaged by the other spring, and a stop for limiting the disengaging movement of the trigger.

EDVARD HED.
  JOHAN AUGUST HELLSING.
Witnesses:
  Nils Lundberg,
  S. Ericsson.